United States Patent
Wong et al.

(10) Patent No.: US 10,568,047 B2
(45) Date of Patent: Feb. 18, 2020

(54) BASE STATION SLEEP MODE BASED ON POWDER CONSUMPTION AND/OR QUALITY OF SERVICE

(71) Applicant: City University of Hong Kong, Kowloon (HK)

(72) Inventors: Wing Ming Eric Wong, Kowloon (HK); Jingjin Timothy Wu, Kowloon (HK); Yin Chi Chan, Kowloon (HK); Moshe Zukerman, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/869,141

(22) Filed: Jan. 12, 2018

(65) Prior Publication Data

US 2019/0223111 A1    Jul. 18, 2019

(51) Int. Cl.
| | |
|---|---|
| *H04W 52/02* | (2009.01) |
| *H04W 88/08* | (2009.01) |
| *H04W 24/02* | (2009.01) |
| *H04W 52/26* | (2009.01) |
| *H04W 52/10* | (2009.01) |
| *H04W 52/38* | (2009.01) |
| *H04W 24/10* | (2009.01) |
| *H04W 24/08* | (2009.01) |

(52) U.S. Cl.
CPC .......... *H04W 52/26* (2013.01); *H04W 24/02* (2013.01); *H04W 24/10* (2013.01); *H04W 52/0206* (2013.01); *H04W 52/10* (2013.01); *H04W 52/386* (2013.01); *H04W 24/08* (2013.01); *H04W 88/08* (2013.01)

(58) Field of Classification Search
CPC ............. H04W 52/0206; H04W 24/02; H04W 36/165; H04W 36/22; H04W 40/005; Y02D 70/00; Y02D 70/1262; Y02D 70/142; Y02D 70/144
USPC .................................................. 455/444, 522
See application file for complete search history.

(56) References Cited

U.S. PATENT DOCUMENTS

| | | | |
|---|---|---|---|
| 2010/0149971 A1* | 6/2010 | Noriega | H04L 47/10 370/230 |
| 2015/0119047 A1* | 4/2015 | Macias | H04W 52/0206 455/444 |

* cited by examiner

*Primary Examiner* — Philip Sobutka
(74) *Attorney, Agent, or Firm* — Renner Kenner Greive Bobak Taylor & Weber

(57) ABSTRACT

A method for operating a communication system and a communication system includes the steps of: powering a plurality of base stations each operating in at least a sleep mode and an active mode, wherein the base station operates in the sleep mode with less power consumption than in the active mode; analyzing an overall power consumption for powering the plurality of base stations with respect to a quality of service of the communication system; and a switching at least one of the plurality of base stations to operate between the sleep mode and the active mode based on a result associated with the overall power consumption and/or the quality of service.

30 Claims, 10 Drawing Sheets

Figure 2

BASE STATION SLEEP MODE BASED ON POWDER CONSUMPTION AND/OR QUALITY OF SERVICE

TECHNICAL FIELD

The present invention relates to a method for operating a communication system and a communication system, and particularly, although not exclusively, to a system and a method for power management in a communication system.

BACKGROUND

Base station is widely used in telecommunication industry. It provides a connection between mobile phones and the telephone network by receiving and transmitting signals in the cellular network to users and their devices. Since each base station only covers a limited area, a network of base stations is usually set up to cover a larger distance for enabling users to request for a service or task at different locations.

With the rapid growth and development of telecommunication, more and more communication systems and base stations are set up to meet with the increasing demand. However, it also leads to a surge in energy consumption and pollution, posing a noticeable impact on the environment. Not only do the communication systems require a lot of energy for active functioning, they may also require an air-conditioning system for cooling, and further contribute to noise pollution, global radiation, temperature increase, etc.

SUMMARY OF THE INVENTION

In accordance with a first aspect of the present invention, there is provided a method for operating a communication system, comprising the steps of: powering a plurality of base stations each operating in at least a sleep mode and an active mode, wherein the base station operates in the sleep mode with less power consumption than in the active mode; analyzing an overall power consumption for powering the plurality of base stations with respect to a quality of service of the communication system; and switching at least one of the plurality of base stations to operate between the sleeping mode and the active mode based on a result associated with the overall power consumption and/or the quality of service.

In an embodiment of the first aspect, the plurality of base stations are further arranged to operate in the sleep mode or the active mode based on a plurality of operating policies.

In an embodiment of the first aspect, the operating policies include an individual policy in which each of the base stations operating in the active mode is arranged to switch to operate in the sleep mode when upon the base station is determined to have been idle for a predetermined period.

In an embodiment of the first aspect, the base station operating in the sleep mode is further arranged to switch to operate in the active mode when upon a predetermined number of service requests is reached.

In an embodiment of the first aspect, the operating policies include a group policy in which at least one of the plurality of base station is arranged to switch between operating in the sleep mode and the active mode based on a predetermined pattern and/or a dynamic pattern associated with a predetermined traffic load, preferably a real-time traffic load offered by the communication system.

In an embodiment of the first aspect, the base station operating in the sleep mode is arranged to pass a service request reaching the respective base station to an alternative base station of the plurality of base stations.

In an embodiment of the first aspect, the alternative base station is a nearby base station.

In an embodiment of the first aspect, the operating policies include a hybrid policy in which at least one of the plurality of the base stations is further arranged to operate based on the individual policy.

In an embodiment of the first aspect, the step of switching at least one of the plurality of base stations to operate between the sleep mode and the active mode includes switching the plurality of base stations to operate in a selected one of the plurality of operating policies.

In an embodiment of the first aspect, the step of analyzing the overall power consumption with respect the quality of service includes estimating the overall power consumption and the quality of service of the communication system when the plurality of base stations operates based on each of the plurality of operating policies.

In an embodiment of the first aspect, the quality of service is represented by at least one attributes associated with the performance of the plurality of base station in processing service requests reaching at least one of the plurality of base station.

In an embodiment of the first aspect, the at least one attributes includes a blocking probability and a delay period in processing the service requests.

In an embodiment of the first aspect, the method further comprises the step of determining a representation associated with the at least one attributes and the overall power consumption using an analytical approximation.

In an embodiment of the first aspect, the representation is further associated with a predetermined traffic load offered by the communication system.

In an embodiment of the first aspect, the analytical approximation is based on a single server processor sharing queue or a network of single server processor sharing queues.

In an embodiment of the first aspect, the single server processor sharing queue includes the parameters of Poison arrivals, exponentially distributed service time, a finite buffer and vacations.

In an embodiment of the first aspect, the plurality of base stations are arranged to facilitate a cellular network.

In accordance with a second aspect of the present invention, there is provided a communication system, wherein the communication system comprises: a communication module including a plurality of base stations each arranged to operate in at least a sleep mode and an active mode, wherein the base station operates in the sleep mode with less power consumption than in the active mode; an analyzer module arranged to analyze an overall power consumption for powering the plurality of base stations with respect to a quality of service of the communication system; and a control module arranged to switch at least one of the plurality of base stations to operate between the sleeping mode and the active mode based on a result associated with the overall power consumption and/or the quality of service.

In an embodiment of the second aspect, the communication system is the communication system of the first aspect.

In an embodiment of the second aspect, the plurality of base stations are further arranged to operate in the sleep mode or the active mode based on a plurality of operating policies.

In an embodiment of the second aspect, the operating policies include an individual policy in which each of the base stations operating in the active mode is arranged to switch to operate in the sleeping mode when upon the base station is determined to have been idle for a predetermined period.

In an embodiment of the second aspect, the base station operating in the sleep mode is further arranged to switch to operate in the active mode when upon a predetermined number of service requests is reached.

In an embodiment of the second aspect, the operating policies include a group policy in which at least one of the plurality of base station is arranged to switch between operating in the sleep mode and the active mode based on a predetermined pattern and/or a dynamic pattern associated with a predetermined traffic load offered by the communication system.

In an embodiment of the second aspect, the base station operating in the sleep mode is arranged to pass a service request reaching the respective base station to an alternative base station of the plurality of base stations.

In an embodiment of the second aspect, the alternative base station is a nearby base station.

In an embodiment of the second aspect, the operating policies include a hybrid policy in which at least one of the plurality of the base stations is further arranged to operate based on the individual policy.

In an embodiment of the second aspect, the control module is arranged to switch the plurality of base stations to operate in a selected one of the plurality of operating policies.

In an embodiment of the second aspect, the analyzer module is arranged to estimate the overall power consumption and the quality of service of the communication system when the plurality of base stations operates based on each of the plurality of operating policies.

In an embodiment of the second aspect, the quality of service is represented by at least one attributes associated with the performance of the plurality of base station in processing service requests reaching at least one of the plurality of base station.

In an embodiment of the second aspect, the at least one attributes includes a blocking probability and a delay period in processing the service requests.

In an embodiment of the second aspect, the analyzer module is further arranged to determine a representation associated with the at least one attributes and the overall power consumption using an analytical approximation.

In an embodiment of the second aspect, the representation is further associated with an predetermined traffic load offered by the communication system.

In an embodiment of the second aspect, the analytical approximation is based on a single server processor sharing queue.

In an embodiment of the second aspect, the single server processor sharing queue includes the parameters of Poison arrivals, exponentially distributed service time, a finite buffer and vacations.

In an embodiment of the second aspect, the plurality of base stations are arranged to facilitate a cellular network.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
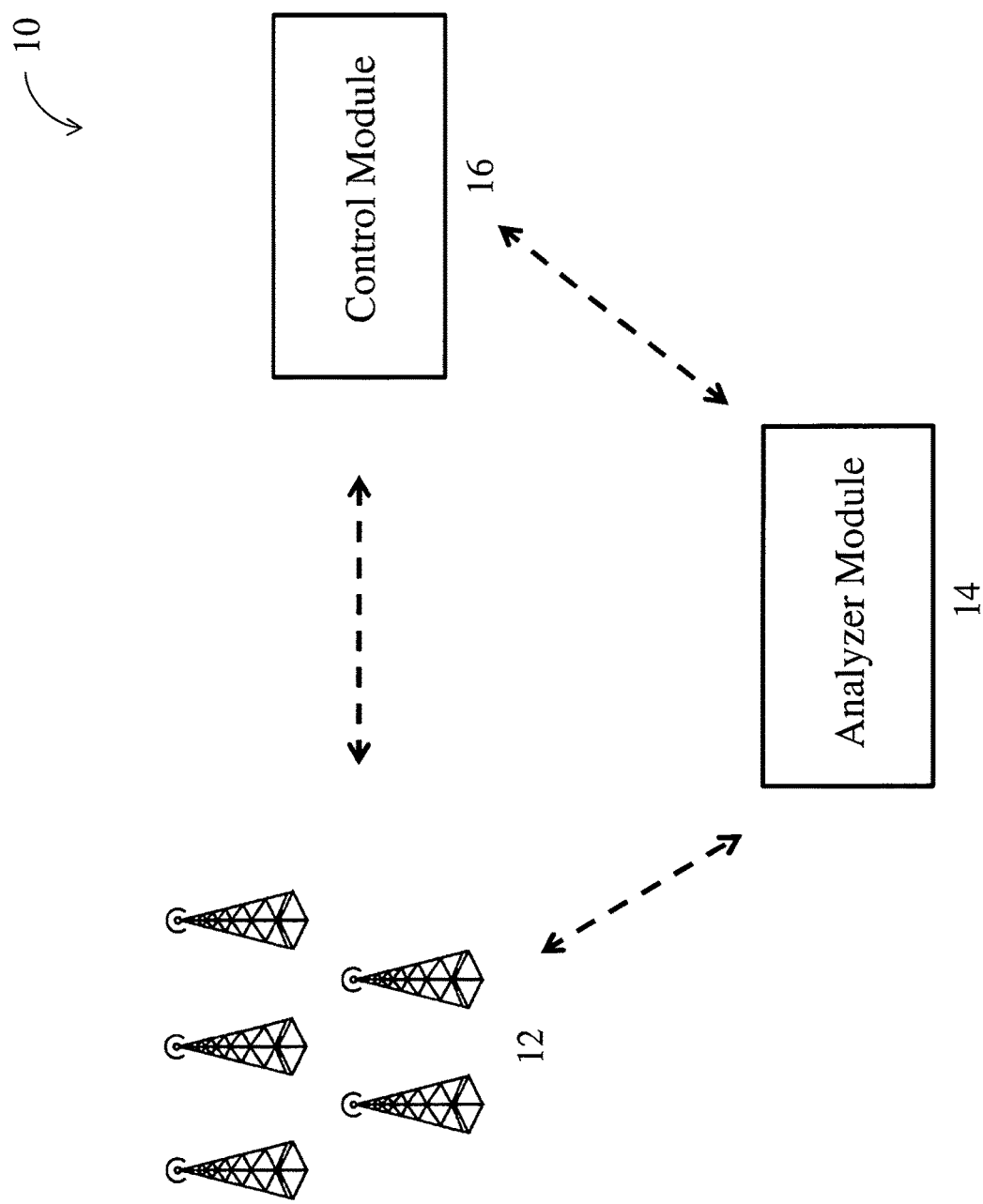
FIG. 1 is an illustration of a communication system in accordance to one embodiment of the present invention.

The inventors have, through their own research, trials and experiments, devised a communication system with base station (BS) sleeping such that the energy efficiency and Quality of Service (QoS) is optimised. Base station (BS) sleeping is a technique to reduce energy consumption in cellular mobile networks. Energy saving is achieved by switching BSs (or some components of them) into a low power-consuming mode called "sleep mode" when traffic load is low.

Comparing to other energy-efficient approaches such as upgrading hardware components or adopting renewable energy resources, BS sleeping has the advantage of convenience and cost effectiveness as it can be implemented in existing network infrastructure. As BSs are responsible for a significant proportion of energy consumed in cellular networks (over 80% in certain scenarios), BS sleeping may be applied to save a large amount of energy. On the other hand, the total capacity of the network is reduced while some BSs are switched to the sleep mode. Therefore, it is essential to be able to monitor and evaluate the quality of service (QoS) and its implications with BS sleeping, in particular, the trade-off between energy saving and QoS measures, including mean delay and blocking probability of different BS sleeping schemes or operating policies.

In one example, base stations (BSs) may be used in a cellular/WLAN integrated network by modelling a WLAN channel as an M/G/1/K-PS queue, which is a finite-buffer queue with vacations and a PS service discipline. In another example, a single server queue with vacations may be considered for obtaining closed-form results of the tradeoff between energy consumption and delay for different sleeping schemes or operating policies. A single cell model and a user association scheme may be simulated to enable users of sleeping BSs to associate with a nearby active BS to continue their services. Alternatively, a user association scheme may associate users of sleeping BSs to an active BS with maximum mean channel access probability, for improving spectral efficiency and minimizing outage probability of the network.

In one embodiment, a cellular system with channel borrowing capabilities may be regarded as an overflow loss system. When a first BS that a request attempted is busy, the request may overflow to an alternative BS. The user association schemes resemble channel borrowing in some way, as users associated to sleeping BSs are allowed to be served by other BSs remaining active.

According to one embodiment of the invention, there is provided an example method involving two EFPA-based approximation techniques, i.e. the EFPA and an Information Exchange Surrogate Approximation (IESA). The Erlang Fixed-Point Approximation (EFPA) may be one approximation method for evaluating blocking probability in overflow loss systems. However, estimation results in systems may be inaccurate where mutual overflow effects are present, due to unrealistic assumptions.

The IESA framework has its roots in the EFPA, in order to improve the accuracy of approximation for such systems, which may include other approximation techniques such as moment matching. IESA is a framework proposed to combat the approximation error caused by unrealistic assumptions in EFPA, therefore IESA may be more accurate than EFPA in terms of blocking probability estimation. The model may be extended to allow BS sleeping with fixed switching patterns (group policy). Also, blocking probability is considered as the QoS measure by modeling each BS as an M/M/K/K queue (loss system). Realistic M/M/1/K-PS queue with vacations (delay-loss system) may be used to measure both mean delay and blocking probability. Furthermore, group policy as well as two additional BS sleeping schemes (individual policy and a combination of individual policy and group policy) may also be analysed.

With reference to FIG. 1, there is provided a communication system 10 comprising a communication module 12 including a plurality of base stations each arranged to operate in at least a sleep mode and an active mode, wherein the base station operates in the sleep mode with less power consumption than in the active mode; an analyser module 14 arranged to analyse an overall power consumption for powering the plurality of base stations with respect to a quality of service of the communication system; and a control module 16 arranged to switch at least one of the plurality of base stations to operate between the sleep mode and the active mode based on a result associated with the overall power consumption and/or the quality of service (QoS).

In this embodiment, the communication system 10 may be arranged to facilitate a cellular network, such as a mobile communication network for mobile communication devices. Preferably, the communication module 12 comprises a plurality of base station in communication with each other, so as to facilitate the data communication or the network traffic between communication devices serviced within the network coverage of the cellular network formed by the plurality of base stations.

For example, a service request, such as a transmission of a data packet, a voice call, a text message, a voice message or a video stream, may be initiated by a mobile device. The service request may be handled or processed by one of the base stations within the cellular network, preferably the one with the strongest signal strength between the base station and the mobile device when the service request is initiated or being processed.

Each of the plurality of base stations may communicate directly with other base stations within the network, or through the analyser module 14 and/or the control module 16. In this example, there are five base stations. In other examples, there may be three, ten, or twenty base stations, depending on the service required. The communication between each base station is preferably wireless, but may also be wired.

With the communication capability between the base stations, each of the base stations may pass a service request to an adjacent base station, such that the service request may be handled by the respective adjacent base station. As discussed above, base stations may overflow or handover the service requests or the calls to an alternative base station within the same network (or a sub-network within the network) due to a local or a mobile demand. Preferably, the alternative base station is adjacent to the base station where the service request reaches at.

The communication module 12 is further in communication with the analyser module 14. The analyser module 14 may include a processor for analysing the performance of each individual base station or the whole network of base stations. Performance of base station may include overall power consumption, energy efficiency and quality of service (QoS). The analyser module 14 may further comprise a memory for storing the analysed performance results. Optionally, the analyser module 14 may transfer the analysed performance results to a storage cloud wireless for data record.

The analyser module 14 may then communicate the analysed performance results with the control module 16. The control module 16 may include a control system for switching the communication module 12 to operate in different operating policies. Operation policies may include an individual policy, a group policy, and a hybrid policy. The control module 16 may separately control each individual base station in the communication module 12 or the whole network of base stations.

Each of the analyser module and the control module may be wholly or partly included in a computer server including a processor for executing suitable computer-executable instructions in performing the analysis. Alternatively, each of the analyser module and the control module may be implemented as a dedicated apparatus or system which is specifically design to analyze the performances of the base stations and to control the operations of the base stations according to the results of the analysis.

In this embodiment a network or a group of BSs may be operating in different operating policies. Each BS may be modelled or represented as a single server Processor Sharing (PS) queue with Poison arrivals, exponentially distributed service time, a finite buffer and vacations, namely an M/M/1/K-PS queue with vacations. Under this model or representation, data or voice calls from different users may be assumed to arrive according to a Poison process and are served simultaneously by the BS. In a PS queue, the service capacity of the server (BS) is shared equally among all the customers being served. This queueing system is based on the properties for the M/G/1/K-PS queuing system where the mean delay and blocking probability are insensitive to the service time distribution. The system may not accept further arrivals when there are K ongoing calls in a BS. Therefore, the minimum data rate for each accepted call may be guaranteed. When the value of K increases, more calls may be accepted simultaneously and thus accepted calls may have lower data rate and higher mean delay if offered traffic is high.

According to one embodiment of the invention, new users arrive at each BS according to a Poison process with rate $\lambda$. Service times of users are exponentially distributed with mean $\mu$. BS sleeping may be implemented separately in each single cell (individual policy) or cooperatively among multiple BSs (group policy). The group policy is based on dynamic capacity allocation and user association techniques. These techniques enable a user to use the capacity originally assigned to another BS if the first BS it attempts cannot offer the required service due to insufficient capacity or sleeping operation. Alternatively, the two policies may be implemented in a hybrid fashion so as to optimize the operation of the communication system in terms of traffic loads and power consumptions.

Figure 4:
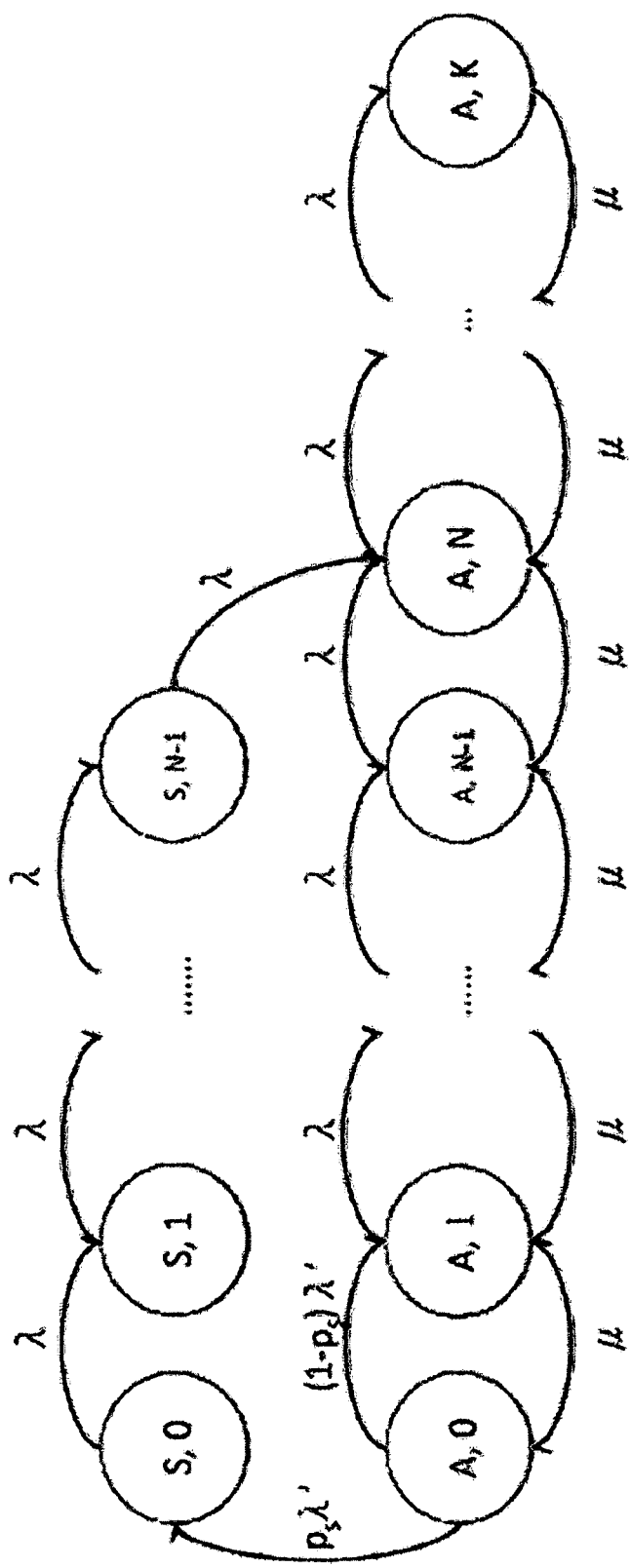
FIG. 4 is an illustration shown an example Markov Chain representation of N-policy sleeping scheme.

A first operating policy may be an individual policy wherein a BS will switch to sleep mode when it has been idle (serving no users) for a predetermined time interval or a close-down period of t*. The sleeping BS may be reactivated when a predetermined number of users have been accumulated during the sleep period. With reference to FIG. 4, an individual policy may follow a Markov Chain representation.

A second operating policy may be a group policy wherein BSs are selectively switched to sleep mode based on fixed pattern or dynamic patterns according to traffic load. For example, a number of BS in a group may be configured to sleep during assigned periods of time in a day when the traffic load demands are relatively low. Under this policy, users associated with a BS that has gone to sleep may be re-associated and served by one of active BSs nearby.

A third operating policy may be a hybrid policy wherein some BSs are switched to sleep mode based on fixed/dynamic patterns as in the group policy. Other BSs may be configured to follow the individual policy to sleep and reactivate. Preferably, the hybrid policy provides a flexibility to optimize a pattern combining advantages of the fixed and the dynamic patterns, therefore may be more advantageous over the first and the second operation policy in accordance with some preferred embodiments of the present invention.

With the BS operating in different modes according to the operating policies, power consumptions of a BS may be preferably divided into two parts, namely variable power consumption such as power amplifiers which depends on the traffic load carried by the BS, and static power consumption such as air conditioning and signal processing which is consumed as long as the BS is active. A sleeping BS consumes much less power as compared to an active one. Following the above, the power consumption of a BS is given by $$P_{BS} = \begin{cases} P_{static} + \frac{A}{C} P_v^{max} & \text{when active,} \\ P_{sleep} & \text{when sleeping} \end{cases} \quad (1)$$

where $P_{static}$ is static power consumption, A is traffic load of the BS, C is the capacity of the BS, and $P_v^{max}$ is the variable power consumption if the BS is fully loaded.

Figure 2:
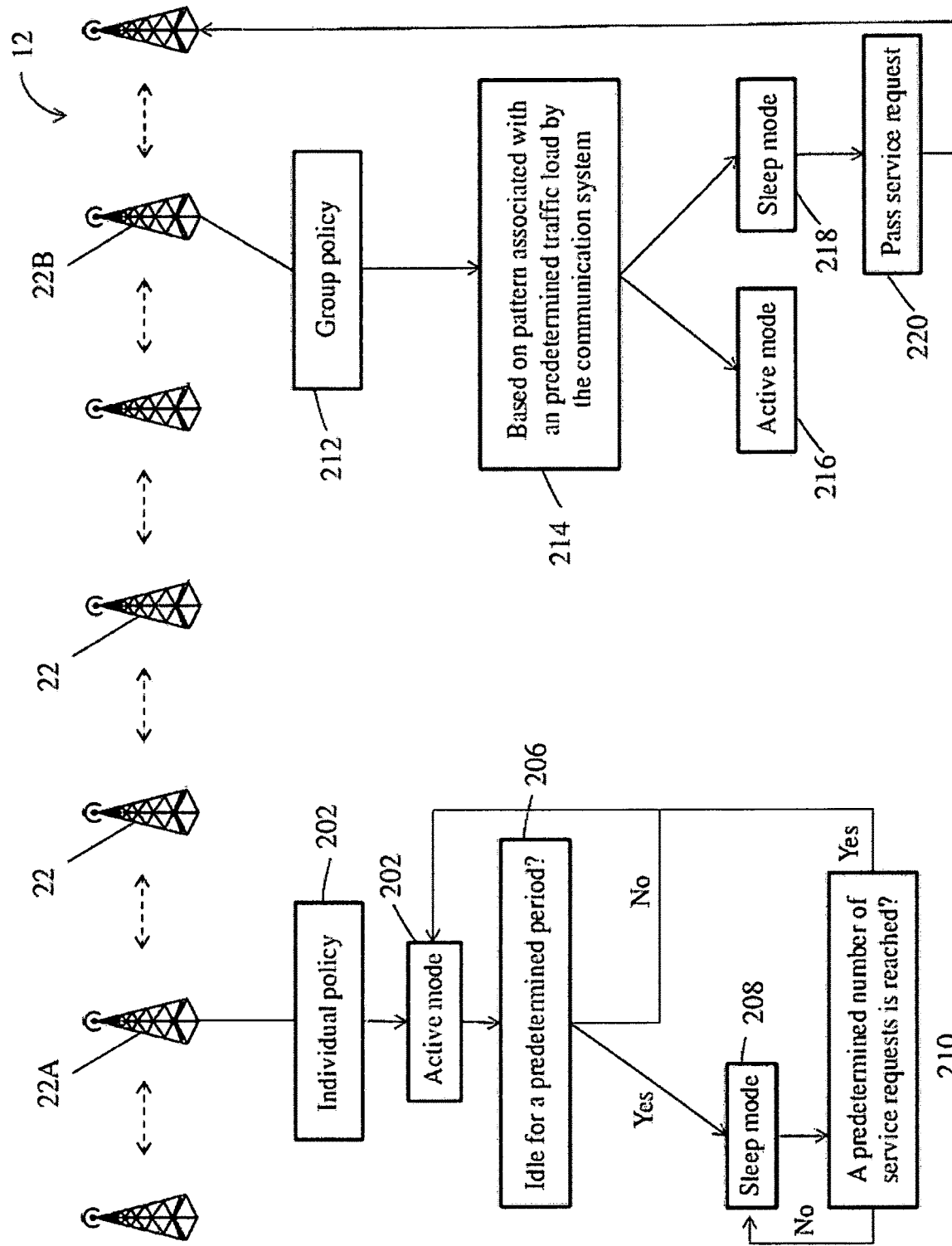
FIG. 2 is an illustration of a communication module of FIG. 1 which includes multiple base stations operating based on different operating policies.

Referring to FIG. 2, there is shown a communication module 12 arranged to be operating in a hybrid policy. In this embodiment, there are seven base stations 22 with at least one base station operating based on an individual policy 202 and at least one base station operating based on a group policy 212. Base stations 22 may switch from operating based on an individual policy 202 to a group policy 212, or vice versa, according to a command from the control module 12. The base stations 22 are further arranged to operate in a sleep mode or an active mode based on the operating policies.

In this embodiment, a base station 22A is arranged to operate based on an individual policy 202. Preferably, the base station 22A is in an active mode 204 by default. When upon the base station 22A is determined to have been idle for a predetermined period 206, the base station 22A is switched to a sleep mode for energy saving 208. When upon a predetermined number of service requests is reached 210, the base station 22A is arranged to switch to an active mode.

Another base station 22B is arranged to operate based on a group policy 212. Preferably, there is a predetermined and/or dynamic pattern for each base station 22B, associated with a predetermined traffic load offered by the communication system 214. Based on the predetermined and/or dynamic pattern, the base station 22B is arranged to switch between operating in a sleep mode 218 or an active mode 216. Upon a service request reaching a base station 22B at a sleep mode, the base station 22B is arranged to pass the service request 220 to an alternative base station 22. The alternative base station 22 may be a nearby base station operating in an active mode.

In some example embodiments, the dominant traffic of cellular networks may include the transmissions of packet-switched data due to the prevalence of mobile multimedia applications such as web browsing, video streaming, online gaming, peer-to-peer video on demand and video conference, rather than voice data transmissions. It may be preferable to avoid situations where large flows of data generated by some users slow down service to users generation small flows justifies the use of a processor sharing queuing discipline that in turn justifies the PS model.

Preferably, delay sensitivity of the multimedia mobile traffic may be monitored as a minimum data rate needs to be guaranteed for such traffic. An upper limit may be set on the number of admitted connections, in order to guarantee that admitted connections satisfy delay and data rate requirements. Both the mean delay and the drop rate (or "blocking probability") due to violation of such requirements may be evaluated.

In one example, simulation may be applied to evaluate Quality of Service (QoS) metrics such as blocking probability and delay in telecommunication networks when an exact analytical solution method is not available. However, simulations are not scalable and cannot be used in realistically sized systems and networks as the running time becomes prohibitive. In another example, evaluations by analytical approximations with reasonable accuracy and computational efficiency may be applied to many applications such as network design, where computational efficiency is essential for searching optimal solutions.

Figure 3:
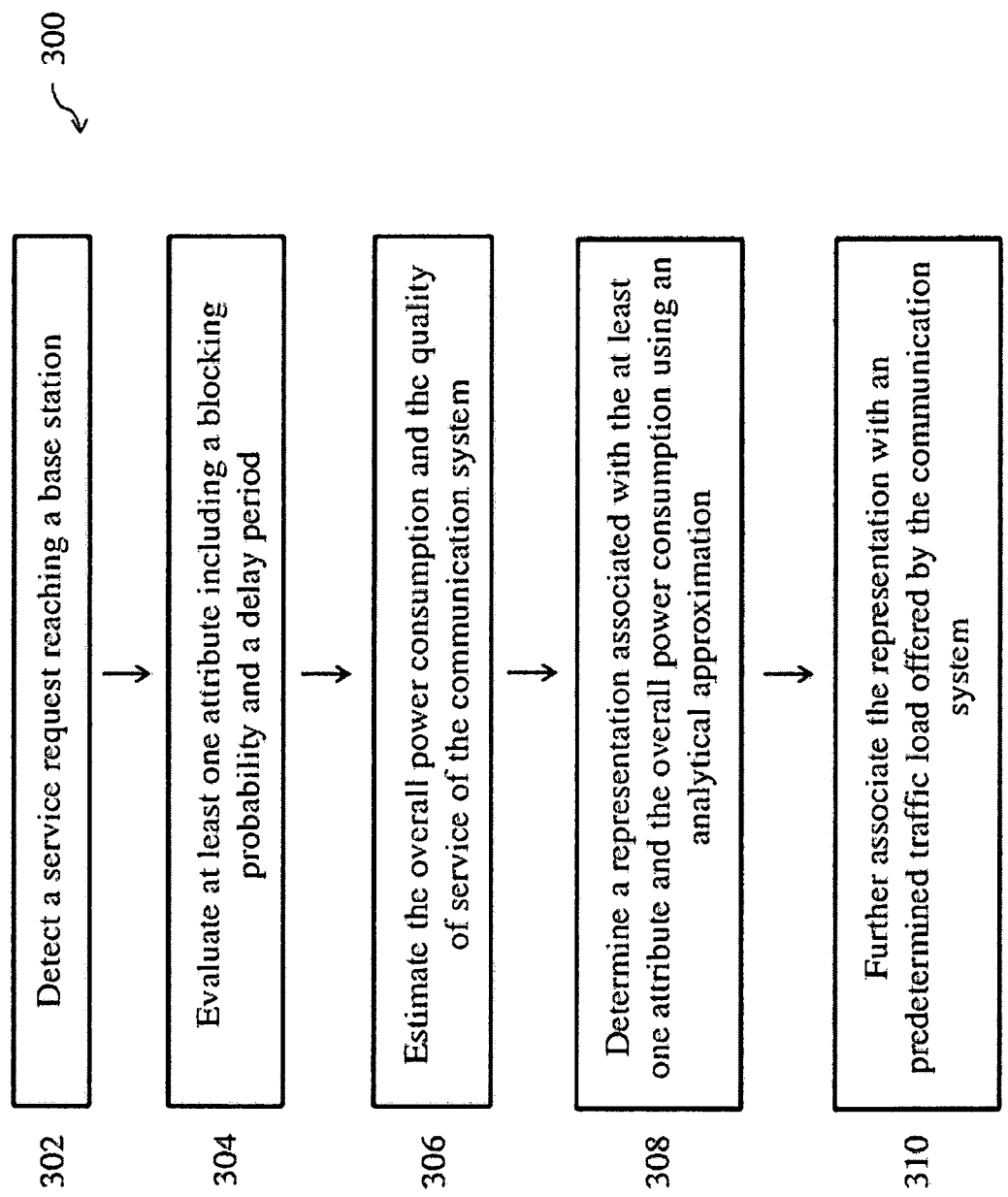
FIG. 3 is a flow diagram showing an operation of the analyser module of the communication system of FIG. 1.

Referring to FIG. 3, there is shown a flow diagram of an example operation 300 of the analyser module 14 for analysing the performance of a base station in one embodiment. In this embodiment, in step 302, the analyser module 14 may detect a service request reaching individual base station. The performance of base station in processing the service request is analysed. For example, in step 304, the analyser module 14 may evaluate one or more attributes associated with the performance, such as blocking probability and delay period. In step 306, the analyser module 14 may further estimate the overall power consumption and the quality of service (QoS) of the communication system when the base stations are operating based on different operating policies.

Based on these analysis, in step 308, the analyser module 14 may determine a representation associated with the one or more attributes and the overall power consumption using an analytical approximation. The analytical approximation is based on a single server processor sharing queue, including parameters of Poison arrivals, service time distribution (which may be exponential as discussed earlier), a finite buffer and vacation. In one example, the representation may be the tradeoff between the one or more attributes and the power consumption. In another example, the representation may be a number on a scale, a symbol, etc. The representation determined may be further associated with a predetermined traffic load offered by the communication system in step 310.

An analytical approximation method based on queuing theory and the Information Exchange Surrogate Approximation (IESA) framework may be used to obtain the mean delay and blocking probability of relevant models. The performance of the communication system 10 with the BS operating in different operation policies, such as individual policy, group policy and hybrid policy under different network conditions may be compared and evaluated.

The analytical expressions of QoS measures including mean delay and blocking probability may be derived for each operating policy. For individual policy, the state probability equations are derived as the following. The probability that a BS will go to sleep is equal to the probability that no customer arrives during the close-down period t* after the BS becomes idle. As the arrivals follow a Poison process, the probability $p_s$ is given by:

$$p_s = e^{-\lambda t_*}. \tag{2}$$

Due to the close-down period, the effective arrival rate $\lambda'$ at state (A; 0) is different from $\lambda$. By definition, the system will leave state (A; 0) under either of the following two conditions: 1) the BS enters the sleep mode after the close-down period expires (transit to state (S; 0) with a probability of $p_s$); 2) a customer arrives before the close-down period expires (transit to state (A; 1) with a probability of $1-p_s$). Therefore, the mean time that the system spends at state (A; 0) is equal to $$t' = (1-p_s)\frac{1}{\lambda} + p_s t^*. \tag{3}$$

The value of $\lambda'$ can be then calculated by $$\lambda' = \frac{1}{t'} = \frac{1}{(1-p_s)\frac{1}{\lambda} + p_s t^*}. \tag{4}$$

Based on (2) and (4), the transition probabilities from state (A; 0) to states (S; 0) and (A; 1) are $p_s\lambda'$ and $(1-p_s)\lambda'$, respectively. Transitions probabilities between other states are intuitive based on the Markov Chain. The steady-state probability of state (M; n) is denoted as $\pi_{M;n}$, and set $A=\lambda/\mu$ and $A'=\lambda'/\mu$. All steady-state probabilities can be expressed in terms of $\pi_{A,0}$ by:

$$\pi_{S,0} = \frac{\lambda'}{\lambda} p_s \pi_{A,0}, \tag{5}$$

$$\pi_{S,i} = \pi_{S,0}(1 \le i \le N-1), \tag{6}$$

$$\pi_{A,i} = \begin{cases} A'\pi_{A,0} & \text{for } i=1, \\ A\pi_{A,N-1} + A'p_s\pi_{A,0} & \text{for } 1 < i \le N, \\ A\pi_{A,N-1} & \text{for } N < i \le K \end{cases} \tag{7}$$

Combining (5), (6), (7) along with the normalization equation:

$$\sum_{i=0}^{K} \pi_{A,i} + \sum_{j=0}^{N-1} \pi_{S,j} = 1, \tag{8}$$

All the steady-state probabilities $\pi_{M;n}$ can be obtained. The mean queue size E(Q) is given by:

$$E(Q) = \sum_{i=0}^{K} i\pi_{A,i} + \sum_{j=0}^{N-1} j\pi_{S,j}. \tag{9}$$

The blocking probability E(B) is given by $$E(B) = \pi_{A,K}. \tag{10}$$

By Little's law, the mean delay E(D) is given by $$E(D) = \frac{E(Q)}{\lambda(1-E(B))}. \tag{11}$$

The proportion of time that the BS spends in sleep mode is given by $$p_{sleep} = \frac{\sum_{j=0}^{N-1} \pi_{S,j}}{\sum_{i=0}^{K} \pi_{A,i} + \sum_{j=0}^{N-1} \pi_{S,j}}. \tag{12}$$

By (1) and (12), the average power consumption for a BS in the isolated scheme is $$P^{iso} = p_{sleep}P_{sleep} + p_{active}P_{active}, \tag{13}$$

in which $p_{active} = 1 - p_{sleep}$, and $P_{active} = P_{static} + \frac{AP_v^{max}}{C}$.

For group policy and hybrid policy, as analysing a multi-BS system is needed, an exact analytical solution may not be available due to the curse of dimensionality. Therefore, the IESA framework may be preferred as a reasonably accurate estimation of the QoS measures in a computationally efficient manner may be obtained.

IESA may be used to evaluate blocking probability in systems where mutual overflow exists whereby the traditional EFPA-based approximation to a surrogate model is applied. To avoid underestimation of blocking probability in such system due to certain inherent assumptions, the surrogate system for IESA is preferred to increase the validity of both assumptions. Therefore, when the EFPA-based approximation is applied to the surrogate model, these approximation errors due to the Poison and independence assumptions may be reduced.

The surrogate system is formally described as follows. Each request may include three attributes, namely the identity I, overflow record Δ, and estimation of congestion level Ω. I contains the "identity" information on the request which does not change during its service period, such as its origin and expected service time. A represents the set of BSs that has rejected admission of the request due to sleep or violation of delay requirement. $\Omega$ contains information on the number of overflows ever experienced by the request itself or other existing requests in the network.

Let $\Gamma_i$ denote the set of BSs that a request originated from BS i is allowed to overflow. A new request has $\Delta=\emptyset$; and $\Omega=0$. When request $\zeta$ originated from BS m with attributes $I_\zeta$; $\Delta_\zeta$; $\Omega_\zeta$ arrives at BS i (i and m can be the same), it will be admitted if its admission does not cause violation of the delay requirement for other existing requests. Otherwise, if the most senior (highest $\Omega$) request $\kappa$ in service has $\Omega_\kappa<\Omega_\zeta$, the incoming request $\zeta$ will overflow to one of the BSs in $\Gamma_m-i$ and its attributes become $\{I_\zeta, \Delta_\zeta \cup I, \Omega_\zeta+1\}$. However, if $\Omega_\kappa \geq \Omega_{70}$, requests $\kappa$ and $\zeta$ and will exchange their third attribute, $\Omega$, before request $\zeta$'s overflow. In this way, the overflow request will have attributes $\{I_\zeta, \Delta_\zeta i \Omega_\zeta+1\}$ and the request in service will have $\{I_\kappa, \Delta_\kappa, \Omega_\zeta\}$.

By the information exchange mechanism, an overflow request retains its identity (I) and actual overflow record ($\Delta$) while gathering network congestion information ($\Omega$) from other calls. By definition, $|\Delta| \leq \Omega$ for any request in the network. The attributes and the information exchange process described previously are designed for a special mechanism that estimates the probability that all of the unattempted BSs are not available.

The estimation is based on the values of $\Delta$ and $\Omega$ of an overflow request. If all of the unattempted BSs are presumed unavailable, the request will be blocked and cleared immediately without attempting the remaining BSs. $p_\kappa^*$, $|\Delta_\zeta|$, $\Omega_\zeta$ is defined as the probability that a request $\zeta$ with the attributes $\{I_\zeta, \Delta_\zeta, \Omega_\zeta\}$, gives up attempting in a surrogate model with parameter k*. The parameter k* is dependent on the specific system and is defined as the maximum allowable value of the attribute $\Omega$ of any request in the surrogate model and is a measure of the level of dependency in the real system. Denote $n_i=|\Gamma_i|$, then $p_\kappa^*$, $|\Delta_\zeta|$, $\Omega_\zeta$ is evaluated as:

$$p_{k^*}, |\Delta|, \Omega = \begin{cases} 0 & \text{if } \Omega < n_i, \\ \dfrac{\binom{\Omega-|\Delta|}{n_i-|\Delta|}}{\binom{k^*-|\Delta|}{n_i-|\Delta|}} & \text{if } \Omega \geq n_i \end{cases}, \quad (14)$$

where $|\Delta| \leq n_i \leq k^*$.

$a_{i,j,n}$ is defined as traffic offered to BS i with n overflows and $\Omega=j$, and $A_{i,j}$ as total combined traffic offered to i with $\Omega \leq j$, the relationship between these two parameters is $$A_{i,j} = \sum_{l=0}^{j} \sum_{m=0}^{l} a_{i,l,m}, \quad (15)$$

By definition, $A_{i,j}=A_{i,j-1}+\Sigma_{n=0}^{min(j,nm)} a_i$, j for j=1, 2, ... k*−1 with initial values $A_{i;0}=a_{i;0;0} A_i=\lambda_i/\mu_i$.

The surrogate is a hierarchical system based on the value of $\Omega$. Blocking probability at a certain level is not affected by the traffic on higher levels (higher value of $\Omega$). Therefore, if the blocking probability of an M/M/1/K-PS queue (without vacations) with offered traffic A is denoted as $p_b^{PS}(A; K)$, the relationship between the blocking probability $B_{i,j}$ and $A_{i,j}$ at each level j can be obtained as $$B_{i,j} = \begin{cases} p_b^{PS}(A_{i,j}, K) & \text{if } BS\ i \text{ is active;} \\ 1 & \text{if } BS\ i \text{ is sleeping} \end{cases}, \quad (16)$$

where $0 \leq j \leq k^*$.

In normal circumstances, blocked traffic at a BS is allowed to overflow to other BSs. However, due to the giving up mechanism above, a proportion of the overflow traffic will be dropped. The dropped traffic will not be included when calculating the blocking probability of the next level. The traffic offered to the highest level of the system, namely level k*−1, is the total offered traffic as it includes all the levels below. Therefore, $A_{i;k^*-1}(1-B_{i,k^*-1}^I)$ is the total carried traffic by BS i. The system blocking probability can thus be measured by 1 minus the ratio of carried traffic to the offered traffic. Thus we can derive the system blocking probability by IESA as:

$$\hat{B} = 1 - \frac{\Sigma_{i \in U} A_{i,k^*-1}(1-B_{i,k^*-1})}{\Sigma_{i \in U} A_i}, \quad (17)$$

where U is the set of all BSs in the system.

Denote $\lambda_i = A_{i,k^*}/\mu$. Referring back to previous analysis for the individual policy, by replacing $\lambda$ with $\lambda_i$ and setting $t^*=\infty$ (as the BSs will not enter sleep mode due to BS operating policies), the approximated mean delay following the same analysis as in (2) to (11) can be obtained.

The power consumption of an active BS i in the cooperative scheme is given by $$P_i^{coop} = P_{static} + \frac{A_i P_v^{max}}{C_i}. \quad (18)$$

The hybrid policy is the joint application of the individual and group policies. The QoS measures for the hybrid policy can be obtained by following the analysis of the group policy. However, when calculating the blocking probability of traffic at each level in a single BS as in Equation (16), we should replace the term as $p_b^{PS}(A_{i,k}; K)$, in (16) by E(B) in (10) following the analysis of ((2) to (10)), as the state probabilities for a BS in the hybrid policy follow an M/M/1/K-PS queue with vacations and BS operating policies. In the hybrid policy, a BS selected to be active based on the switching patterns may still enter sleep due to the BS operating policies. Therefore, the power consumption of such a BS is given by $$P_i^{hyb} = p_{active}\left(P_{static} + \frac{A_i P_v^{max}}{C_i}\right) + p_{sleep} P_{sleep}. \quad (19)$$

Figure 5:
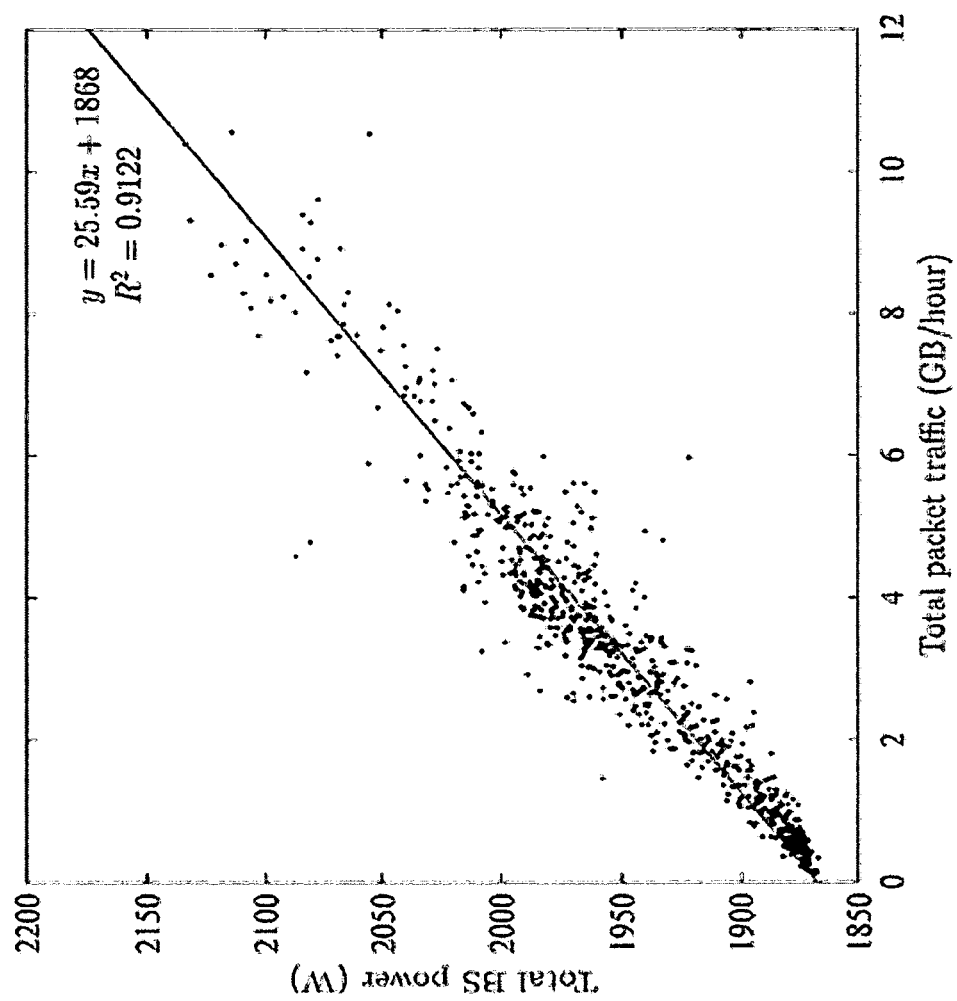
FIG. 5 is a plot showing a data result of the power consumption of a real BS site.

Experiments were performed to evaluate the performances of an example cellular network infrastructure in accordance with the embodiments of the present invention. Referring to FIG. 5, there is shown power consumption data collected from a real BS site. Static power consumption was about 1867.6 W and the maximum power consumption was about 2150 W. It was assumed that the site was composed of 7 identical BSs (such that $P_{static} \approx 266.8$ W and $P_v^{max} \approx 40.43$ W for each BS) and one BS was switched to sleep for the group and hybrid policies (assume Psleep $\approx$ 10 W). Traffic offered to each BS was the same with mean arrival rate λ=0.8 arrivals/s (if not specified otherwise) and mean service time 1/μ=1 s. The parameter k* for IESA was set to 12.

Figure 6:
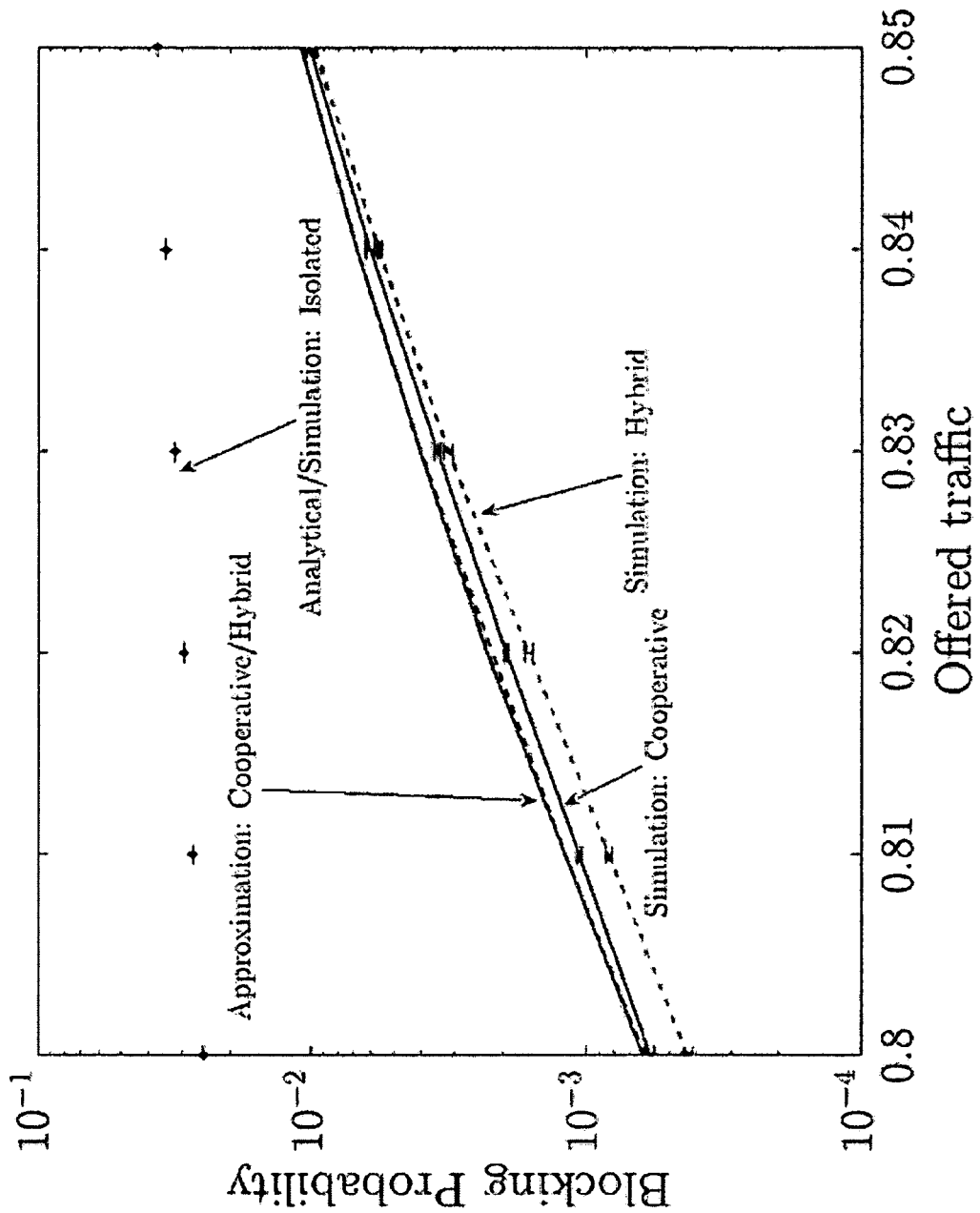
FIG. 6 is a plot showing an experiment result of the accuracy of approximations for blocking probability.
Figure 7:
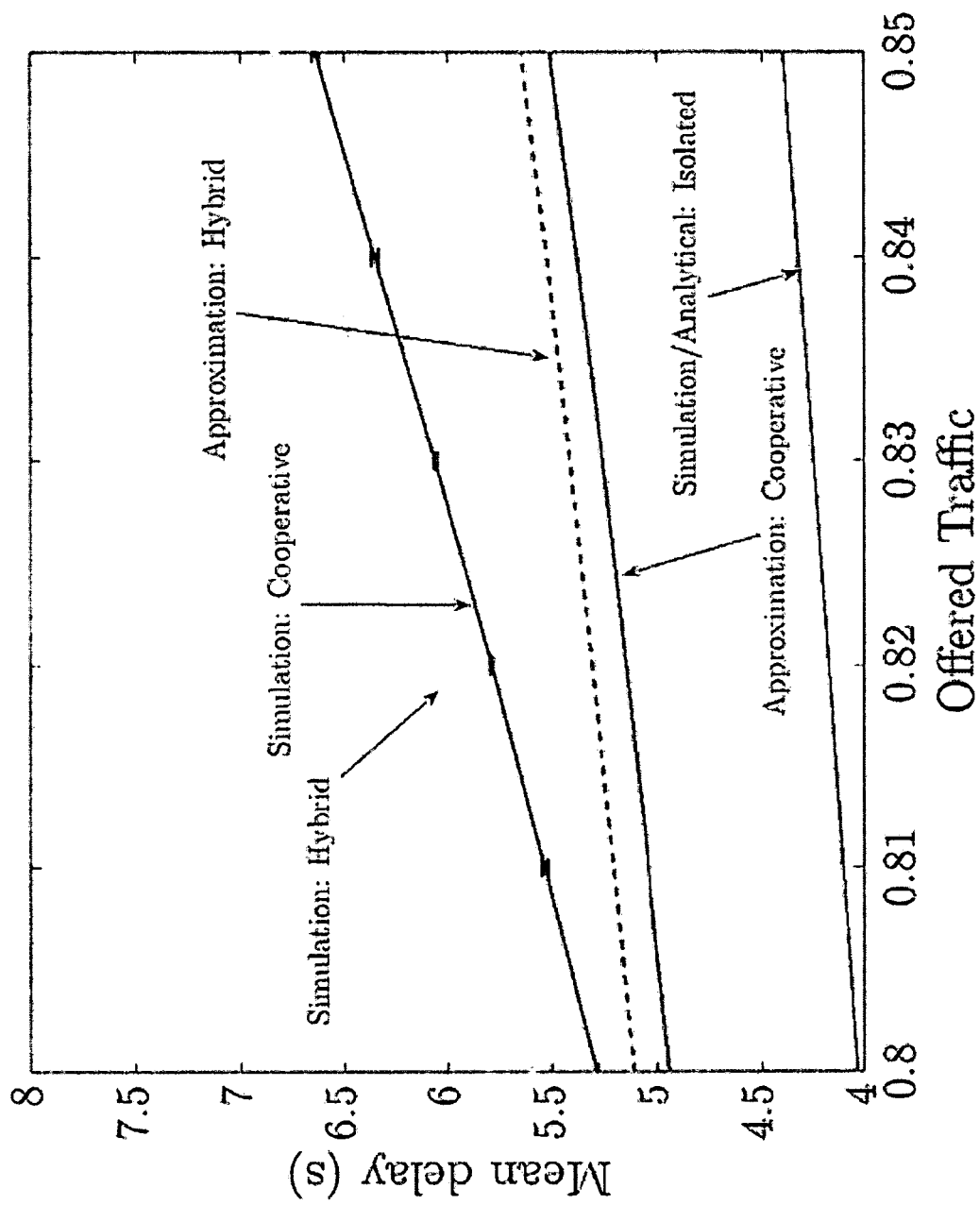
FIG. 7 is a plot showing an experiment result of the accuracy of approximations for mean delay.

Now referring to FIG. 6 and FIG. 7, there is shown an experiment result showing the analytical and simulation results for blocking probability and mean delay for all policies. Parameters were set as N=3; t*=3 for the individual and hybrid policies. From the results, analytical analysis validates that the individual policy gives very accurate results for blocking probability and mean delay, and the approximations for mean delay and blocking probability in both group policy and hybrid policy are quite accurate.

For group policy and hybrid policy, traffic load corresponding to the blocking probability range was $10^{-3}$-$10^{-2}$, which may be practical for cellular networks in some applications. The results show that the estimation errors of blocking probability and mean delay in both schemes were less than 20%. In terms of computational efficiency, the running time of analytical approximation (about 0.2 second) was about five orders of magnitude lower than that of simulation (about 3 hours). Given its reasonable accuracy, this approximation can be used for searching optimal solutions to tradeoff between power consumption and QoS in cellular networks.

Figure 8:
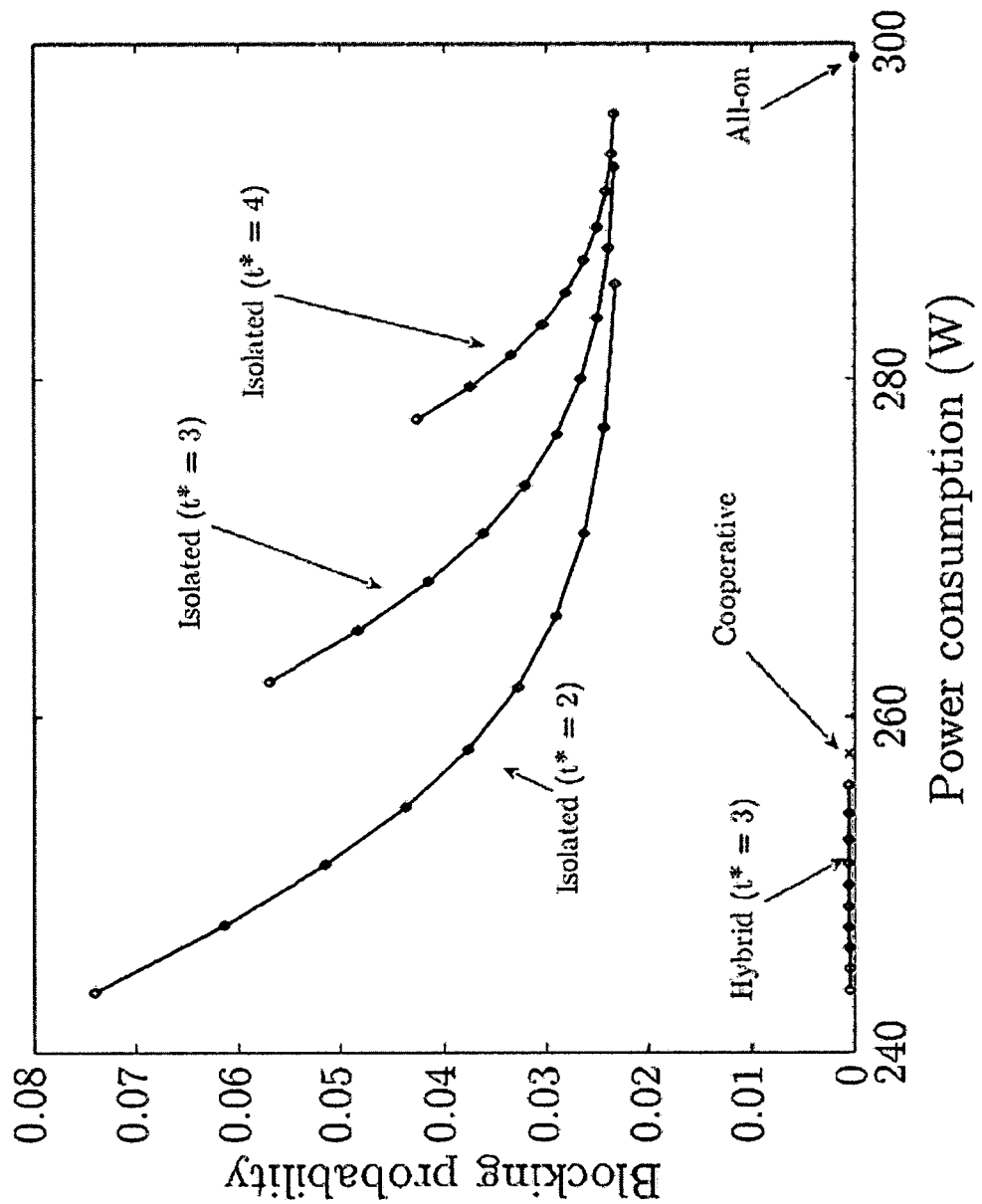
FIG. 8 is a plot showing an experiment result of the tradeoff between power consumption and blocking probability subject to K=10.
Figure 9:
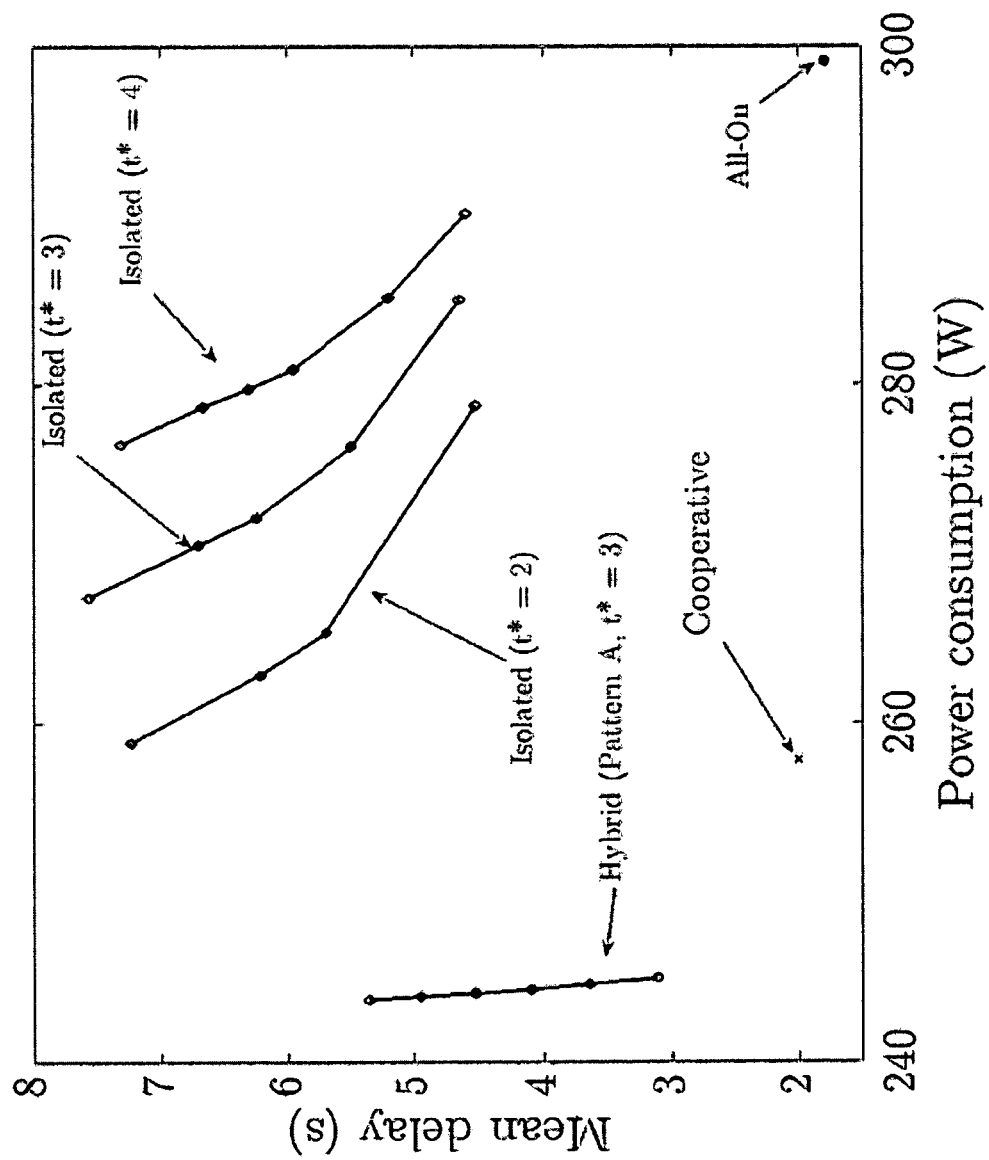
FIG. 9 is a plot showing an experiment result of the tradeoff between power consumption and mean delay subject to blocking probability <1%.

Referring to FIG. 8 and FIG. 9, there is shown an experiment result showing the tradeoff between power consumption and QoS measures including mean delay and blocking probability. In FIG. 8, K was set to be 10 to investigate the power-blocking tradeoff under the same maximum allowable mean delay constraint. Parameter N for the individual policy and the hybrid policy was changed to obtain different values for power consumption and blocking probability. Power consumption for the group policy and hybrid policy was defined as the average power consumption per BS. N is the number of arrivals that must be accumulated for a sleeping BS to be switched to active mode. Therefore, when N increases, power consumption decreases and blocking probability increases, as each BS spends more time in sleep mode.

The results also show that the individual policy was the most flexible scheme in trading off blocking probability for power consumption among all three operating policies. However, the group policy may achieve a lower blocking probability for the same amount of power consumption than the individual policy, and the hybrid policy may further reduce power consumption while attaining similar blocking probability as the group policy.

In FIG. 9, the value of K was set to guarantee that the blocking probability was less than 1% and obtain corresponding values of mean delay and power consumption. The results show that the group policy and hybrid policy may attain a shorter mean delay as compared to the individual policy, while maintaining the same level of power consumption. Meanwhile, similar to the FIG. 8, by adjusting the parameter N, the individual policy and hybrid policy may reduce power consumption at the expense of relatively higher delay.

Figure 10:
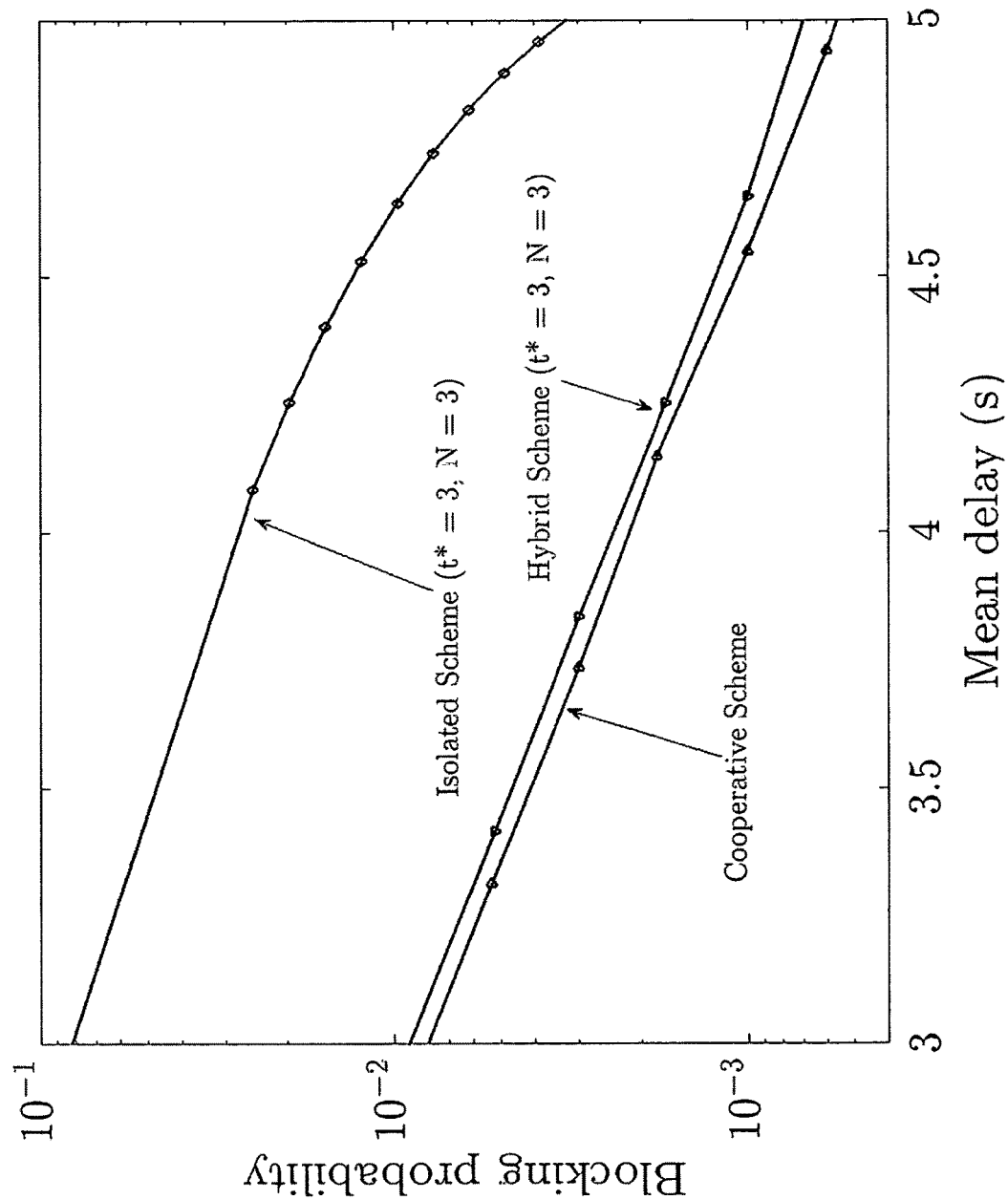
FIG. 10 is a plot showing an experiment result of the tradeoff between blocking probability and mean delay.

Referring to FIG. 10, there is shown a tradeoff between mean delay and blocking probability for individual policy and group policy in a more intuitive way. By adjusting the parameter K while keeping all other parameters constant, different values for maximum allowable delay of a request were set. When the maximum delay requirement is stricter, requests are more likely to be dropped as they fail to satisfy the requirement for every scheme. Also, as power consumptions for all schemes are in a narrow range (240-260 W), it can be concluded that the group policy and hybrid policy may achieve a better delay-blocking tradeoff as compared to the individual policy for a similar amount of power consumption.

The above embodiments may be advantageous in that the performance of BS operating policies can be evaluated in terms of the tradeoff by modelling each BS as an M/M/1/K-PS queue with vacations. Accurate, robust, scalable and computationally efficient analytical means may be applied to evaluate QoS and power consumption in cellular networks with BS sleeping.

In some of these advantageous embodiments, the numerical experimental results show that the group policies and hybrid policy may achieve a better tradeoff as compared to the individual policy. The analytical results may be useful for network design and optimization applications when there is a need to search for optimal solutions, and such a search involves a large number of calculations of mean delay, blocking probability and power consumption under a wide range of conditions and scenarios.

Advantageously, the embodiments of the present invention may be further extended to more general scenarios, including but not limited to networks with multilayer heterogeneous cells, and networks with asymmetrical offered traffic to each BS.

It will be appreciated that where the methods and systems of the present invention may also be either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a communication system, comprising the steps of:
   powering a plurality of base stations based on a plurality of operating policies, which comprise a group policy, each base station operating in an active mode or a sleep mode having less power consumption than in the active mode; wherein under the group policy, the plurality of base base stations are arranged to switch between operating in the sleep mode and the active mode based on a predetermined pattern and a dynamic pattern associated with a predetermined traffic load offered by the communication system;
   analyzing an overall power consumption for powering the plurality of base stations with respect to a quality of service of the communication system; and
   switching at least one of the plurality of base stations to operate between the sleeping mode and the active mode based on a result associated with the overall power consumption and/or the quality of service.

2. The method for operating a communication system in accordance with claim 1, wherein the plurality of operating policies further comprises an individual policy under which a base station of the plurality of base stations operating in the active mode is arranged to switch to operate in the sleep mode when said base station is determined to have been idle for a predetermined period.

3. The method for operating a communication system in accordance with claim 2, wherein a base station of the plurality of base stations operating in the sleep mode is further arranged to switch to operating in the active mode when a predetermined number of service requests is reached.

4. The method for operating a communication system in accordance with claim 2, wherein the plurality of operating policies further comprises a hybrid policy in which at least one of the plurality of base stations is operating under the individual policy, and the remaining of the plurality of base stations is/are operating under the group policy.

5. The method for operating a communication system in accordance with claim 1, wherein a base station of the plurality of base stations operating in the sleep mode is arranged to pass a service request reaching said base station to a surrogate base station of the plurality of base stations.

6. The method for operating a communication system in accordance with claim 5, wherein the surrogate base station is a nearby base station.

7. The method for operating a communication system in accordance with claim 1, wherein the step of switching at least one of the plurality of base stations to operate between the sleep mode and the active mode includes switching the plurality of base stations to operate in a selected one of the plurality of operating policies.

8. The method for operating a communication system in accordance with claim 1, wherein the step of analyzing the overall power consumption with respect to the quality of service includes estimating the overall power consumption and the quality of service of the communication system when the plurality of base stations operates based on each of the plurality of operating policies.

9. The method for operating a communication system in accordance with claim 8, wherein the quality of service is represented by at least one attribute associated with the performance of the plurality of base stations in processing service requests reaching at least one of the plurality of base stations.

10. The method for operating a communication system in accordance with claim 9, wherein the at least one attribute includes a blocking probability and a delay period in processing the service requests.

11. The method for operating a communication system in accordance with claim 9, further comprising the step of determining a representation associated with the at least one attribute and the overall power consumption using an analytical approximation.

12. The method for operating a communication system in accordance with claim 11, wherein the representation is further associated with a predetermined traffic load offered by the communication system.

13. The method for operating a communication system in accordance with claim 11, wherein the analytical approximation is based on a single server processor sharing queue.

14. The method for operating a communication system in accordance with claim 13, wherein the single server processor sharing queue includes the parameters of Poisson arrivals, exponentially distributed service time, a finite buffer and vacations.

15. The method for operating a communication system in accordance with claim 1, wherein the plurality of base stations are arranged to facilitate a cellular network.

16. A communication system comprising:
a plurality of base stations each arranged to operate based on a plurality of operating policies, which comprise a group policy, each base station operable in an active mode or a sleep mode having less power consumption than in the active mode; the base station arranged to switch between operating in the sleep mode and the active mode based on a predetermined pattern and a dynamic pattern associated with a predetermined traffic load offered by the communication system;
an analyzer arranged to analyze an overall power consumption for powering the plurality of base stations with respect to a quality of service of the communication system; and
a controller arranged to switch at least one of the plurality of base stations to operate between the sleeping mode and the active mode based on a result associated with the overall power consumption and/or the quality of service.

17. The communication system in accordance with claim 16, wherein the plurality of operating policies further comprises an individual policy under which a base station of the plurality of base stations operating in the active mode is arranged to switch to operate in the sleeping mode when said base station is determined to have been idle for a predetermined period.

18. The communication system in accordance with claim 17, wherein a base station of the plurality of base stations operating in the sleep mode is further arranged to switch to operating in the active mode when upon a predetermined number of service requests is reached.

19. The communication system in accordance with claim 16, wherein a base station of the plurality of base stations operating in the sleep mode is arranged to pass a service request reaching said base station to a surrogate base station of the plurality of base stations.

20. The communication system in accordance with claim 19, wherein the surrogate base station is a nearby base station.

21. The communication system in accordance with claim 17, wherein the plurality of operating policies further comprises a hybrid policy in which at least one of the plurality of the base stations is operating under the individual policy, and the remaining of the plurality of base stations is/are operating under the group policy.

22. The communication system in accordance with claim 16, wherein the controller is arranged to switch the plurality of base stations to operate in a selected one of the plurality of operating policies.

23. The communication system in accordance with claim 16, wherein the analyzer is arranged to estimate the overall power consumption and the quality of service of the communication system when the plurality of base stations operates based on each of the plurality of operating policies.

24. The communication system in accordance with claim 23, wherein the quality of service is represented by at least one attribute associated with the performance of the plurality of base stations in processing service requests reaching at least one of the plurality of base stations.

25. The communication system in accordance with claim 24, wherein the at least one attribute includes a blocking probability and a delay period in processing the service requests.

26. The communication system in accordance with claim 24, wherein the analyzer is further arranged to determine a representation associated with the at least one attribute and the overall power consumption using an analytical approximation.

27. The communication system in accordance with claim 26, wherein the representation is further associated with a predetermined traffic load offered by the communication system.

28. The communication system in accordance with claim 26, wherein the analytical approximation is based on a single server processor sharing queue.

29. The communication system in accordance with claim 28, wherein the single server processor sharing queue includes the parameters of Poisson arrivals, exponentially distributed service time, a finite buffer and vacations.

30. The communication system in accordance with claim 16, wherein the plurality of base stations are arranged to facilitate a cellular network.

* * * * *

UNITED STATES PATENT AND TRADEMARK OFFICE
CERTIFICATE OF CORRECTION

PATENT NO. : 10,568,047 B2
APPLICATION NO. : 15/869141
DATED : February 18, 2020
INVENTOR(S) : Wing Ming Eric Wong et al.

It is certified that error appears in the above-identified patent and that said Letters Patent is hereby corrected as shown below:

On the Title Page

Item (54) should read BASE STATION SLEEP MODE BASED ON POWER CONSUMPTION AND/OR QUALITY OF SERVICE.

In the Specification

The title at Column 1, Lines 1-3, should read as follows BASE STATION SLEEP MODE BASED ON POWER CONSUMPTION AND/OR QUALITY OF SERVICE.

At Column 2, Line 15, the word "to" is added after "with respect.".

In the Claims

At Column 14, Line 52, the first instance of "base" is deleted.

Signed and Sealed this
Fifteenth Day of December, 2020

Andrei Iancu
*Director of the United States Patent and Trademark Office*